(12) United States Patent
Teixeria

(10) Patent No.: US 6,470,074 B2
(45) Date of Patent: Oct. 22, 2002

(54) SYSTEM AND METHOD FOR PROVIDING DATA AND VOICE SERVICES ON A SHARED LINE

(75) Inventor: Joe Teixeria, Mount Royal (CA)

(73) Assignee: NHC Communications, Inc. (CA)

( * ) Notice: Subject to any disclaimer, the term of this patent is extended or adjusted under 35 U.S.C. 154(b) by 0 days.

(21) Appl. No.: 09/772,961

(22) Filed: Jan. 31, 2001

(65) Prior Publication Data

US 2002/0009181 A1 Jan. 24, 2002

Related U.S. Application Data

(60) Provisional application No. 60/219,136, filed on Jul. 19, 2000.

(51) Int. Cl.[7] ............ H04M 1/24; H04M 3/08; H04M 3/22
(52) U.S. Cl. .............. 379/32.04; 379/15.03; 379/27.01
(58) Field of Search .............. 379/1.01, 1.03, 379/1.04, 22.04, 24, 27.06, 30, 32.04, 15.03, 16–17

(56) References Cited

U.S. PATENT DOCUMENTS 5,459,644 A 10/1995 Warburton
5,619,562 A 4/1997 Maurer et al.
5,704,115 A 1/1998 Warburton
6,069,949 A 5/2000 Schuenhoff et al.
6,072,793 A 6/2000 Dunn et al.
6,075,784 A * 6/2000 Frankel et al.
6,295,339 B1 * 9/2001 Jollota
6,317,493 B1 * 11/2001 Little et al.
6,362,630 B1 * 3/2002 Lowell et al.

* cited by examiner

Primary Examiner—Duc Nguyen
(74) Attorney, Agent, or Firm—Swindler Berlin Shereff Friedman, LLP

(57) ABSTRACT

A cross connect physical layer switching system is integrated into a central office and facilitates delivering data services, such as digital subscriber line (DSL) service, to subscribers over a shared data and voice line. The cross connect physical layer switching system may be placed between a splitter and the shared line to allow a remote test unit to be controllably connected to the shared line to permit testing of the shared line by a competitive local exchange carrier (CLEC). By placing the physical layer switching system in the CO, both the CLEC and the incumbent local exchange carrier (ILEC) have full access to the test head (RTU) and full spectrum testing of the line. This allows test access to continue to be done remotely as in an unshared line environment.

19 Claims, 16 Drawing Sheets

SYSTEM AND METHOD FOR PROVIDING DATA AND VOICE SERVICES ON A SHARED LINE

RELATED APPLICATION

The present application claims the benefit of U.S. Provisional Application No. 60/219,136, filed Jul. 19, 2000 and entitled "Method and Apparatus for Line-Sharing."

FIELD OF THE INVENTION

The present invention relates in general to systems and methods for sharing telecommunications lines and, more particularly, to systems and methods for providing voice and data services on the shared line and to permit full spectrum testing of the shared line to the voice and data service providers.

BACKGROUND OF THE INVENTION

In November 1999, the Federal Communications Commission (FCC) in the United States ruled that Incumbent Local Exchange Carrier (ILECs) must share lines with any Competitive Local Exchange Carrier (CLECs). The goal was to provide consumers with a cost-effective solution for receiving differentiated data services. The ruling (FCC 99-355) allowed ILECs to maintain the low frequency portion of the telecom line providing voice transmission and for CLECs to use the high frequency segment for data access solutions.

Splitters are required to separate the higher frequency portion of the line going to the CLEC collocation from the low frequency portion being used by the ILEC. This arrangement hampered the CLECs from performing full spectrum voice and data testing on the local loop. On the other hand, ILECs are concerned that testing by CLECs might interfere with the ILECs Plain Old Telephone Service (POTS).

In a non-line sharing environment, the CLEC and ILEC each have full-spectrum test access to their respective lines. Since each ILEC has full control over its copper lines, the ILEC can test the local loop for bridge taps, coils and other anomalies that are critical to reliable analog voice transmission and the CLEC can fully test the local loop for parameters that are critical for high-speed data transmission.

However, under the November line-sharing ruling, the ILEC is required to allow the CLEC to share the existing lines to allow it to provide high speed data service on the same line that the ILEC is providing its POTS service. The splitter is a piece of equipment that allows this to happen.

The splitter allows the CLEC to provide high-speed data service to the local loop but blocks it from providing POTS service that is handled by the ILEC. The splitter allows the ILEC to provide POTS voice service but blocks it from providing high speed data service.

The problem is that although the CLEC might not need to provide POTS service, it needs to perform tests at low frequencies. The presence of a splitter prevents the CLEC from conducting low-frequency testing that is crucial to qualifying the line for DSL services. The splitter may be located either in the CLEC collocation (COLLO) or in the ILEC central office (CO) as shown in the diagrams below.

For example, if the splitter is located in the ILEC CO, then the CLEC cannot conduct low frequency testing to ensure that there are no bridge taps or coils on the line. The presence of the taps and coils although not a problem to the ILEC's POTS service, is a major problem for the CLECs who can not test the low-frequency portion of the local loop. In order for line-sharing to work, the CLEC must have full-spectrum test-access to the shared line.

Local loop testing is a function that both CLEC and ILEC want to be able to do remotely. With the splitter in place, if a problem with the local loop arises, the CLEC can only perform high frequency tests, thus preventing it to determine the source of the problem. In order to diagnose a problem the CLEC or ILEC is forced to send a technician to the CO to insert a tester before the line is split. This significantly increases the delay and cost in deploying DSL and other high-speed services.

Accordingly, there is a need for a solution that would allow the CLEC and ILEC to perform line testing on the unfiltered local loop via remote control and to circumvent the splitter for testing purposes. There is a further need for CLEC testing to be performed in a manner that does not interfere with normal operation of voice telephone service provided by the ILEC. There is still a further need for a solution which may be easily deployed and maintained.

SUMMARY OF THE INVENTION

According to the present invention, a cross connect physical layer switching system is integrated into either the CLEC COLLO or the ILEC CO. The cross connect physical layer switching system may be used to facilitate aspects of delivering data services, such as digital subscriber line (DSL) service, to subscribers over a shared data and voice line. For example, the cross connect physical layer switching system may be used for service provisioning, test access for loop qualification, service migration and fallback switching to help reduce the deployment and maintenance time for high-speed data services.

The cross connect physical layer switching system may be placed between a splitter and the shared line to allow a remote test unit to be controllably connected to the shared line to permit testing of the shared line by the CLEC. By placing the physical layer switching system in the CO, both parties have full access to the test head or Remote Test Unit (RTU) and full spectrum testing of the line. This allows test access to continue to be done remotely as in an unshared line environment. The splitter problem is circumvented to allow both the CLEC and ILEC to have full-spectrum test access to the shared local loop. The result is shorter service deployment time, minimization of "truck rolls" and more effective maintenance of the shared local loop. It also allows existing equipment to be used, thereby minimizing the investment costs needed by the Telecommunications Service Providers in order to overcome the technical obstacles of line-sharing.

To protect the ILEC, the CLEC may be provided with limited cross connect access only to shared lines. In order to protect against off-hook interference (such as interfering with a subscriber phone conversation) while the CLEC is qualifying a line for DSL services, the physical layer switching system and the remote test unit cooperate to prevent the test head from being connected to a line if the line is off-hook. When the line goes on-hook, the path to the line by the test head may be enabled. This allows the ILEC to comply with the FCC November ruling and provide full test access capability to the CLEC.

According to one embodiment of the invention, a method of providing shared data and voice service over a telecommunications line includes providing separate voice and data paths, providing a splitter having ports coupled to the separate voice and data paths and a port that represents a combination of signals on the first and second ports, and providing a cross connect switch that controllably connects the splitter to a shared line in a first state and a test unit to the shared line in a second state. Further steps include monitoring the shared line and testing the shared line when the line is on-hook.

The voice path occupies low frequencies of the shared line and the data path occupies high frequencies of the shared line. An ILEC may maintain the voice path and a CLEC the data path. In addition, either the CLEC or the ILEC may provide the cross connect switch and the splitter.

According to another embodiment of the invention, a system provides shared data and voice service over a telecommunications line. The system includes a splitter and a cross connect switch. The splitter has ports coupled to separate voice and data paths and an output that represents a combination of signals on the ports. The cross connect switch controllably connects the splitter to a shared line in a first state and a test unit to the shared line in a second state. The system may further include a controller coupled to the cross connect switch that controls the controllable connections. The controller may be coupled to the cross connect switch via a local or wide area network.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

In November 1999, the Federal Communications Commission (FCC) in the United States ruled that Incumbent Local Exchange Carrier (ILECs) must share lines with any Competitive Local Exchange Carrier (CLECs). The goal was to provide consumers with a cost-effective solution for receiving differentiated data services. The ruling (FCC 99-355) allowed ILECs to maintain the low frequency portion of the telecom line providing voice transmission and for CLECs to use the high frequency segment for data access solutions.

Figure 1:
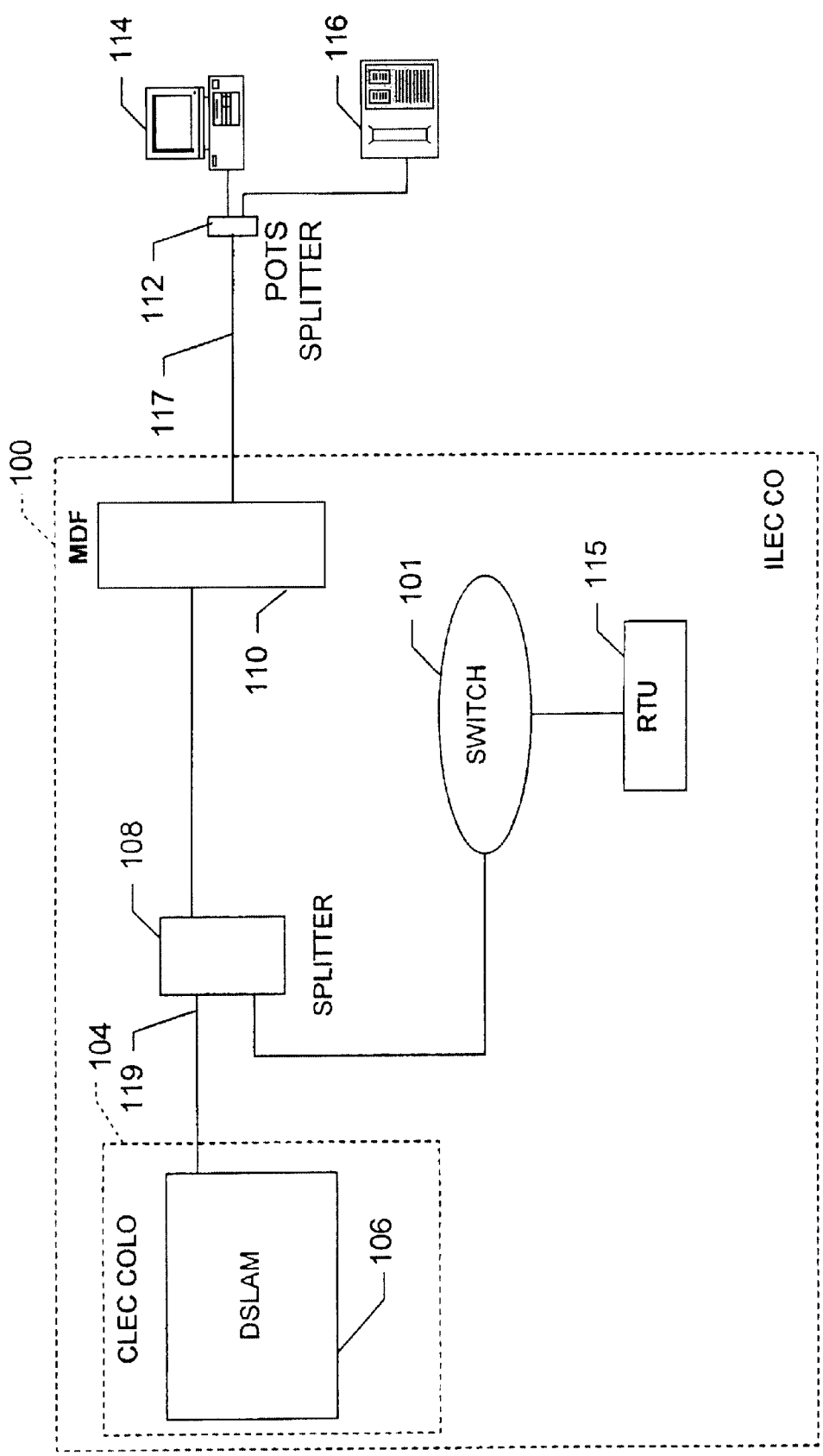
FIG. 1 is a block diagram of a prior art telecommunications system implementing a splitter device for a co-location scheme.

In response to this FCC ruling, ILECS have responded by permitting CLECS to co-locate data services, such as DSL services, within their facilities, A conventional arrangement for such a line sharing scheme is shown in FIG. 1.

Referring to FIG. 1, the ILEC company 100 includes a switch 100 coupled to a MDF 110 through a splitter 108 that provides conventional voice service to subscribers 116 over a shared line 117. The telephone switch 101 connects calls originated by the subscriber to other telephones via a communications network (not shown). The switch also connects incoming calls from the communications network to subscriber telephones 116.

The ILEC company permits a CLEC company 104 to provide co-located data services via the splitter 108 and shared line 117 to subscriber terminal 114. The data services may be, for example, digital subscriber line services (DSL) which is one of the signal protocols being used to carry broadband digital data over existing two-wire telephone lines. There are several versions of DSL in common use. Asymmetric DSL (ADSL) provides greater bandwidth for downstream data than for upstream data. In addition, ADSL reserves a portion of the available channel bandwidth for support of traditional analog telephone service (Plain Old Telephone Service (POTS)). ADSL is aimed primarily at the residential market. Another version of DSL is Symmetric DSL (SDSL). SDSL provides equal bandwidth in both the upstream and downstream directions and does not provide support for POTS. SDSL is better suited to business applications, such as network server communications, etc.

In order to provide, conventional DSL service from the CLEC 104 as shown, the CLEC 104 may deploy a digital subscriber line access multiplexer (DSLAM) 106. The DSLAM 106 is a system that links customer DSL connections to an IP network. Typically, the IP network is the Internet, but may be any public or private data transport network.

In order to provide shared voice and data services, the splitter 108 is conventionally implemented as shown in FIG. 1. The splitter is connected to the DSLAM 106, the switch 101 and to the shared line 117. The shared line 117 is typically that portion of the shared line 117 received from the MDF. The splitter 108 is used to separate the higher frequency portion of the line going to the CLEC collocation from the low frequency portion being used by the ILEC. The splitter 108 is also used to block the ILEC from providing high frequency signals on the shared line and to block the CLEC from providing low frequency signals on the shared line.

Another splitter 112 is conventionally used at the subscriber premises to split the high-frequency data service signal from the POTS voice signal and deliver the signals respectively to a data modem on a subscriber terminal 114 and to the subscriber telephone 116.

In order to perform testing of lines extending from the ILEC central office 100 to subscribers, a remote test unit 115 is conventionally used by ILECs to perform narrowband testing of the local loop. The remote test unit 115 performs testing of the shared line 117 through the switch 101, the splitter 108, the MDF 110 and the splitter 112. Unfortunately, the conventional arrangement of FIG. 1 hampers the CLEC's ability to perform full spectrum testing on the local loop. This is because the splitter 108 inhibits the ability of the RTU 121 to test the local loop at low frequencies when the RTU 121 is connected to the high frequency portion of the line 119 maintained by the CLEC 104.

Figure 2:
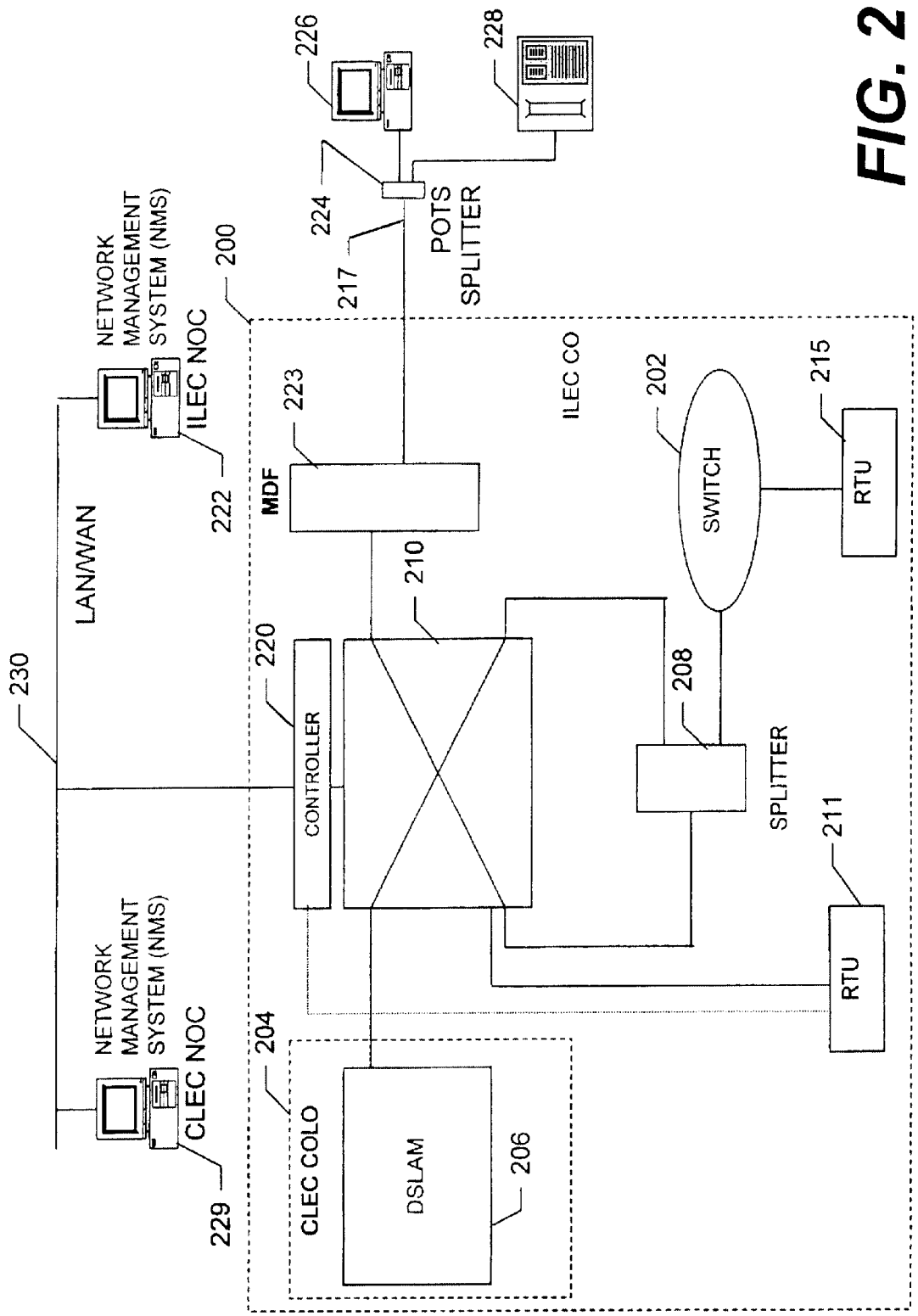
FIG. 2 is an exemplary block diagram of telecommunications system, according to the present invention, implementing xDSL service.

In order to overcome these problems and permit full spectrum testing by the CLEC 104 of the local loop, the arrangement in FIG. 2 may be implemented according to an embodiment of the present invention. This arrangement allows the ILEC to comply with the FCC ruling and provide full test access capability to the CLEC.

Referring to FIG. 2, a cross-connect switch 210, such as the CONTROLPOINT ™ switch available from NHC, may be implemented to facilitate full spectrum test access by the CLEC in addition to the ILEC. As used herein, the terms cross-connect and cross-connect switch are intended to mean any switch capable of reliably interconnecting telecommunications signals, including voice and data signals, from inputs to outputs under the influence of internal or external control signals. The terms are intended to encompass any such switch and control systems, including loop management systems. To illustrate the operation of an embodiment of a cross-connect switch 210 and the manner in which it is controlled, the CONTROLPOINT switch available from NHC is hereafter briefly described.

The CONTROLPOINT solution is NHC's integrated non-blocking copper cross-connect system that helps CLECs and ILECs qualify and provision DSL and other services remotely without the need to enter the CLEC's COLLO or ILEC's CO. The CONTROLPOINT solution works with third party equipment such as Harris, Hekimian and Tollgrade Remote Test Units, enabling the cross-connect to be used as a test access platform for rapid loop qualification. The CONTROLPOINT solution may be deployed for DSL test access for local loop qualification, provisioning, migration and fallback switching. The CONTROLPOINT solution is intended to work with every major DSLAM vendor.

The CONTROLPOINT cross-connect hardware has a matrix size and loopback capabilities that allow multiple services to be provisioned and migrated remotely on-the-fly and on-demand, thereby minimizing truck-rolls needed to qualify and provision high speed data services. The CONTROLPOINT solution allows the service provider to migrate users to higher speed data services quickly. The CLEC has the ability to use any available port on the DSLAM for fallback switching thus providing added value to both the CLEC and the subscriber.

The CONTROLPOINT solution is managed via two-key elements: CONTROLPOINT CMS 222 and CONTROLPOINT CMS Remote (Controller) 220. CONTROLPOINT CMS 222 and 229 is the control and management software for NHC's CONTROLPOINT Solution. Elements 222 and 229 are later referred to generically as network management systems (NMS) and also as terminals. CONTROLPOINT CMS 222 and 229 communicate with NHC's CONTROLPOINT Copper Cross-Connect 210 via the CONTROLPOINT CMS Remote Controller 220 to allow voice and high-speed data service providers to take full control of their copper cross-connect infrastructure.

CONTROLPOINT CMS controls and tracks the physical connections within the CONTROLPOINT matrix, along with vital subscriber and equipment information. CONTROLPOINT CMS features an intuitive Graphical User Interface (GUI) for greater ease of use. Port connections involve a simple drag & drop operation. CONTROLPOINT CMS's integrated database tracks CONTROLPOINT subscriber/service connections and organizes the network into multi-level geographical views by country, city and site location.

CONTROLPOINT CMS Remote is the SNMP control interface for NHC's CONTROLPOINT copper cross-connect switch, which allow the CONTROLPOINT cross-connect 210 to be managed via NHC's CONTROLPOINT Control and Management Software (CMS) or managed via third party Network Management System (NMS). The CONTROLPOINT CMS Remote is connected to an Ethernet LAN and is accessible via standard SNMP commands. The CONTROLPOINT CMS Remote connects to CONTROLPOINT cross-connect via serial link. The device receives standard SNMP commands from the NMS or CONTROLPOINT CMS and communicates them to the CONTROLPOINT cross-connect. Support for API (application interfaces) within the CONTROLPOINT CMS Remote and CONTROLPOINT CMS allows for customization to support NHC's proposed line-sharing solution.

While the CONTROLPOINT switching system may be used to implement the cross-connect switch, it will be understood that any remotely controllable cross-connect switching system may be implemented according to embodiments of the present invention. The cross-connect switch 210 and its controllers are hereafter referred to generically. Also, the terms cross-connect switch and cross-connect are used interchangeably.

The cross-connect 210 may be placed between the MDF 223 and the splitter 208. The cross-connect 210 may also be placed between the DSLAM 206 and the MDF 223. The data service, access to which is provided through the DSLAM 206, is controllably connected through the cross-connect 210 to the splitter 208 back through cross-connect 210 and to the shared line 217. The shared line 217 extends through the MDF 223 to the customer premises equipment which includes a splitter 224. The splitter 224 provides the high frequency data service to the terminal 226 and the lower frequency voice service to the telephone 228.

The telephone switch 202 of the ILEC 200 is coupled to the low frequency portion of the splitter 208, which is also maintained by the ILEC. The RTU 215, is used by the ILEC for narrowband testing of the local loop, may be coupled to the shared line 217 through the switch 202, the splitter 208, cross-connect 210 and the MDF 223. The RTU 211 used by the CLEC 204 may be controllably connected to the shared line 217 through the cross-connect 210 for monitoring and testing.

A network management system (NMS) or other terminals 222 or 229 may be used to control the cross-connect and the RTU 211 via any standard or proprietary network, such as a local area network (LAN) or a wide area network (WAN). The terminals 222 or 229 can control the configuration and operation of the cross-connect 210 over the network and can determine the status and configuration of cross connect switch 210 over network 230.

In one configuration, the terminals 222 and 229 may be coupled to a controller 220 that controls the making of connections within the cross-connect 210. The terminals 222 and 229 may be remotely located from the ILEC 200 thus permitting remote control of provisioning of the data service, and the terminals 222 and 229 may provide remote control of testing by the CLEC 204. The terminals 222 and 229 may be used to send commands to the controller 220 to cause connections within the cross-connect switch 210. The terminals 222 and 229 may also send commands to the RTU 211 (possibly via the controller 220). The commands sent to the controller may include a command to connect the RTU to a shared line 217, to connect the splitter output to the shared line 217, and to send other commands or data to the RTU 211 or the controller 220. The commands sent to the RTU may include commands to monitor a shared line 217 for on-hook and/or off-hook conditions, to conduct full-spectrum (both narrow and wideband) local loop line testing or other testing of the shared line and to return data to the terminal 222 and/or 229. The commands may be sent directly to the RTU 211 or may be sent via the controller 220.

In the event that a terminal 222 or 229 issues a command to monitor the line, the controller will cause the RTU to connect to the shared line 217 and the RTU 211 will conduct a monitoring test to determine whether the line is on or off hook.

Figure 3:
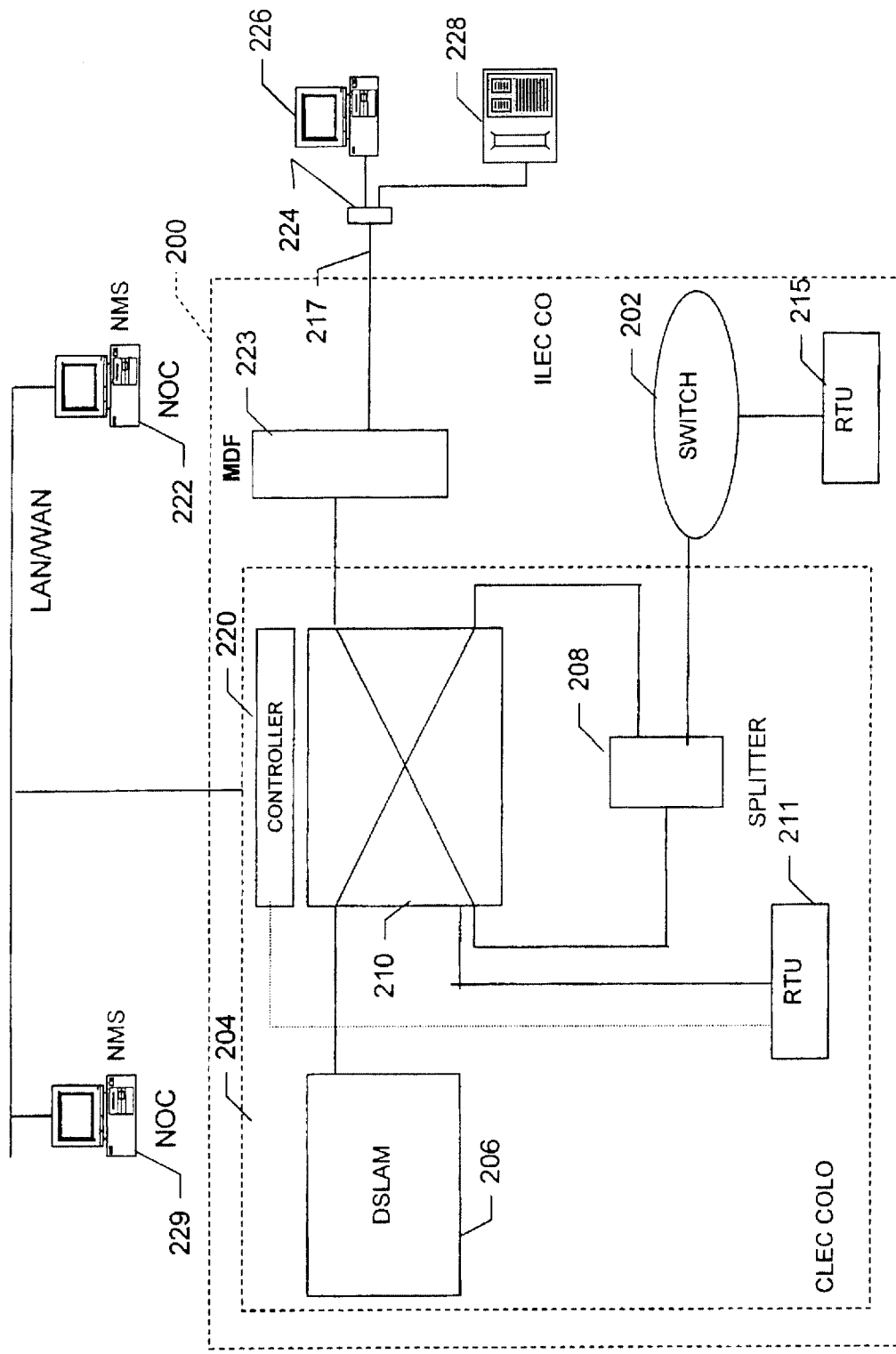
FIG. 3 is an exemplary flow diagram of a process of operation of the present invention, implemented in the system shown in FIG. 2.

FIG. 3 depicts an embodiment of the invention in which the cross-connect 210, the splitter 208 and the RTU 211 are part of the CLEC 204 rather than the ILEC. This scheme and other variations may be implemented depending on the division of responsibilities between the CLEC 204 and the ILEC 200. In general, the ILEC or the CLEC may control any of the functional elements depicted in FIGS. 2 and 3.

Figure 4:
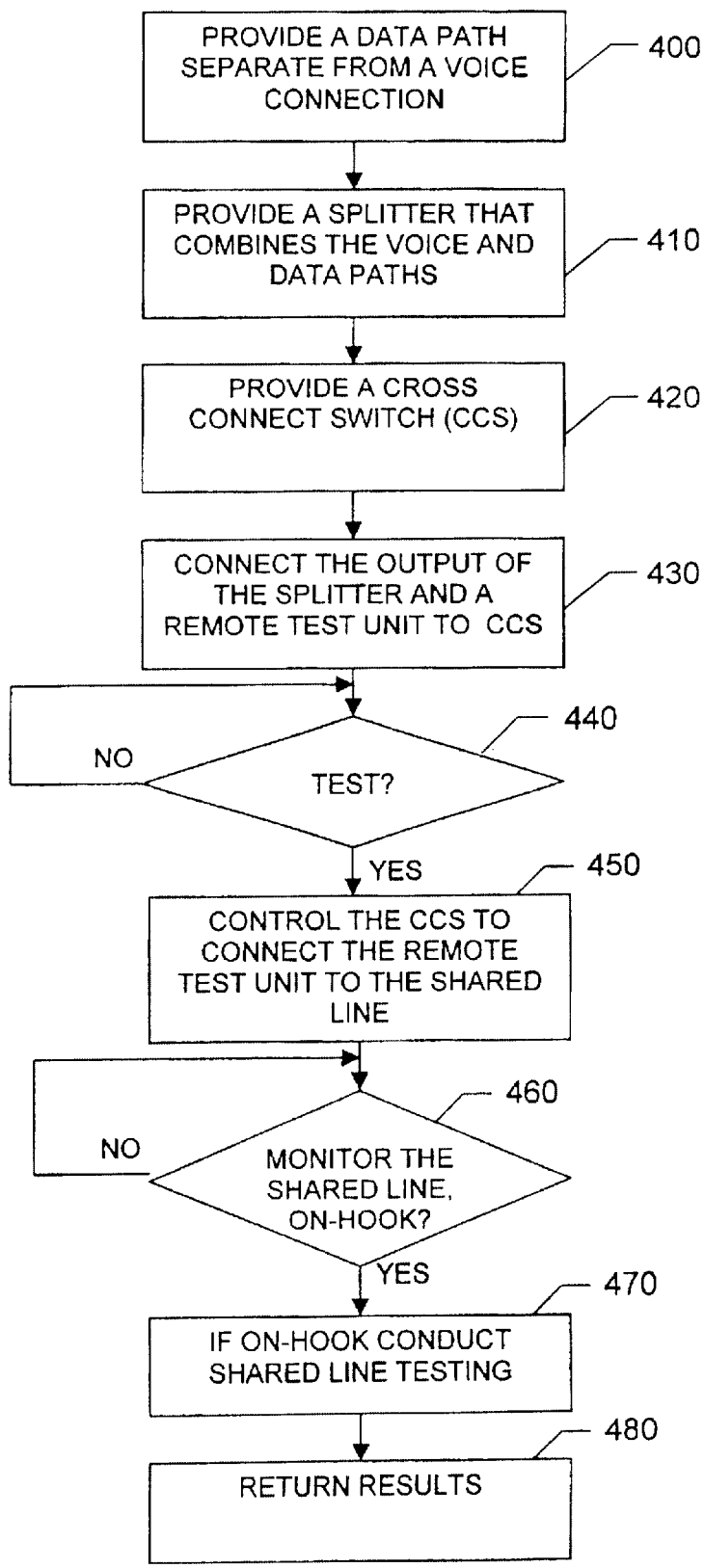
FIG. 4 depicts a method for providing shared line access for data and voice services that permits fall spectrum test access for both the data service provider and the voice service provider.

FIG. 4 depicts a method of providing full spectrum test access for a data service within an ILEC. Referring to FIG. 4, in step 400, a data path separate from a voice path is provided in a telecommunications facility such as a central office. The data path may be a path to a DSLAM 206 for providing DSL service. In step 410, a splitter 208 is provided that couples the separate data and voice paths with a shared line. In step 420, a cross connect switch 210 or loop management system is provided. The data path may be coupled to the splitter through the cross-connect switch 210 in order to facilitate service provisioning. Then in step 430, the output of the splitter 208 and a remote test unit 211 are connected to the cross-connect 210.

In step 440, if a test of a shared line is not required, then step 440 begins again. If a test of a shared line is required, then step 450 begins. In step 450, the terminal 222, 229 or other entity issues a command to the controller 220 to connect the RTU 211 to the shared line 217. In response, the controller 220 controls the cross-connect 210 causing the RTU 211 to be connected to the appropriate shared line. Then in step 460, the RTU 211 monitors the shared line 217 to determine whether the shared line is on-hook. If not, then step 460 is performed again and testing does not proceed. If the shared line is on-hook in step 460, then step 470 begins.

Step 460 protects the ILEC from having its voice service disturbed by the CLEC while a subscriber is actively using the voice service. The ILECs have a major concern that if the CLEC has full-spectrum test access to the shared-line, the CLEC might run its tests while the subscriber equipment is off-hook and therefore interfere with the ILEC's voice service.

In step 470, the RTU 211 conducts full spectrum testing of the shared line 217 through, for example, the cross-connect 210 and the MDF 223. Any testing techniques are contemplated in this step for testing the integrity of the shared line, internal paths within the CLEC or the ILEC or aspects of the customer premises equipment 224–228. As part of step 470, the controller 220 may signal the cross connect switch 210 to disconnect the splitter 208 from the shared line to permit testing of the subscriber line or the service equipment.

In step 480, the RTU 211 returns the results of the testing to an operator. This step may occur by the RTU 211 outputting the results to a display or transmitting data to a remote terminal via a network either directly or via the controller 220. In step 480, the controller 220 may also signal the cross connect switch 210 to reconnect the splitter 208 to the shared line to restore the connection of subscription services to the subscriber's line.

Figure 5:
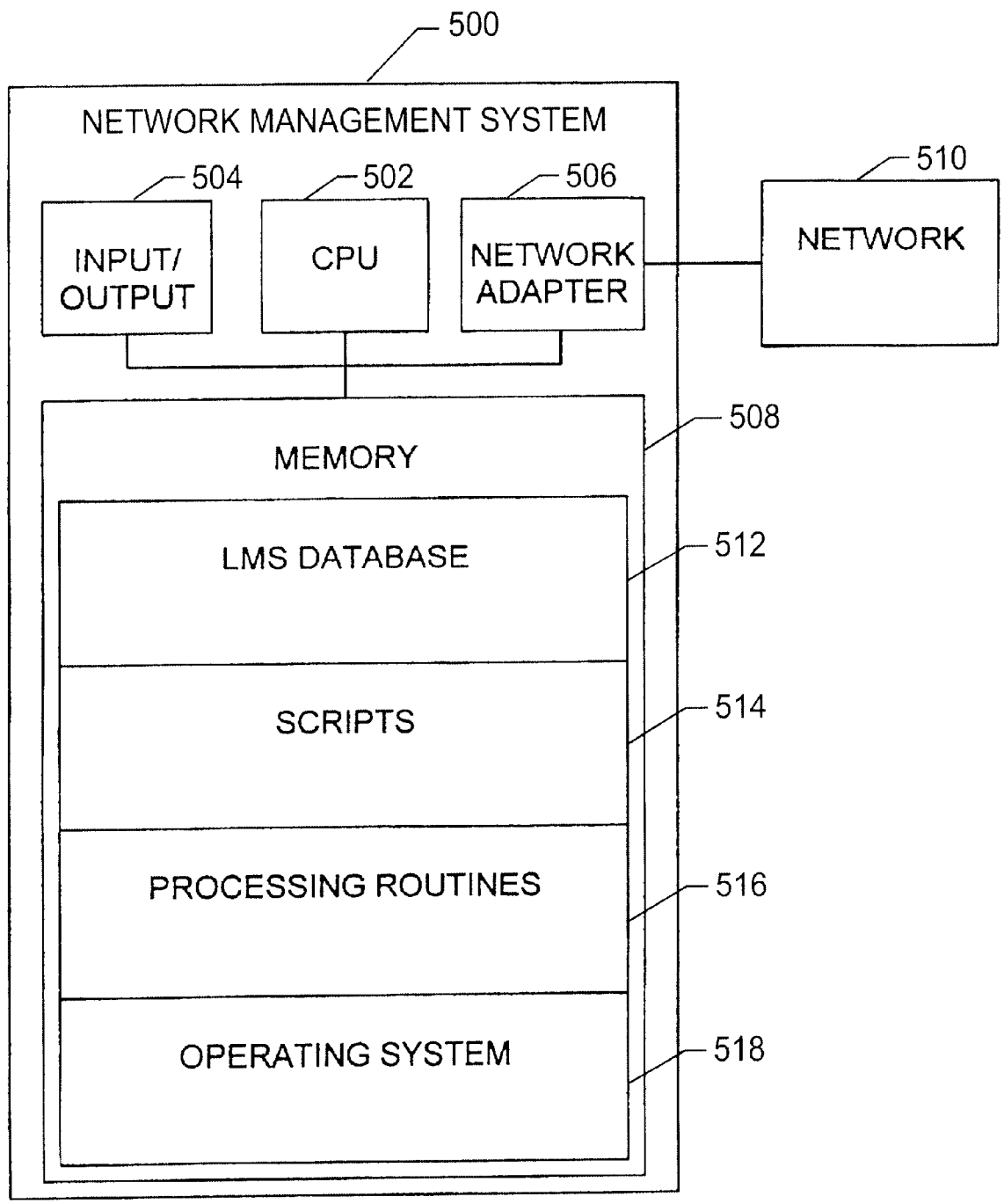
FIG. 5 is an exemplary block diagram of a network management system shown in FIG. 2.

An exemplary block diagram of a network management system 500, according to the present invention, is shown in FIG. 5. Network management system 500 is typically a programmed general-purpose computer system, such as a personal computer, workstation, server system, and mini-computer or mainframe computer. Network management system 500 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces network management system 500 with network 510. Network 510 may be any standard local area network (LAN) or wide area network (WAN), such as Ethernet, Token Ring, the Internet, or a private or proprietary LAN/WAN, but typically, IP network 230 is the Internet.

Memory 508 stores program instructions that are executed by, and data that are used and processed by, CPU 502 to perform the functions of the present invention. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes a plurality of blocks of data, such as Loop Management System (LMS) database 512 and scripts block 514, and a plurality of blocks of program instructions, such as processing routines 516 and operating system 518. LMS database 512 stores information relating to cross connect switches that are managed and controlled by NMS 500, including information relating to connections maintained by the cross connect switch. Scripts block 514 includes scripts that are transmitted by NMS 500 to cross connect switches to control the connection of circuits. Processing routines 516 are software routines that implement the processing performed by the present invention, such as receiving SNMP messages, accessing LMS database 512, transmitting scripts from script block 514, etc. Operating system 518 provides overall system functionality.

Figure 6:
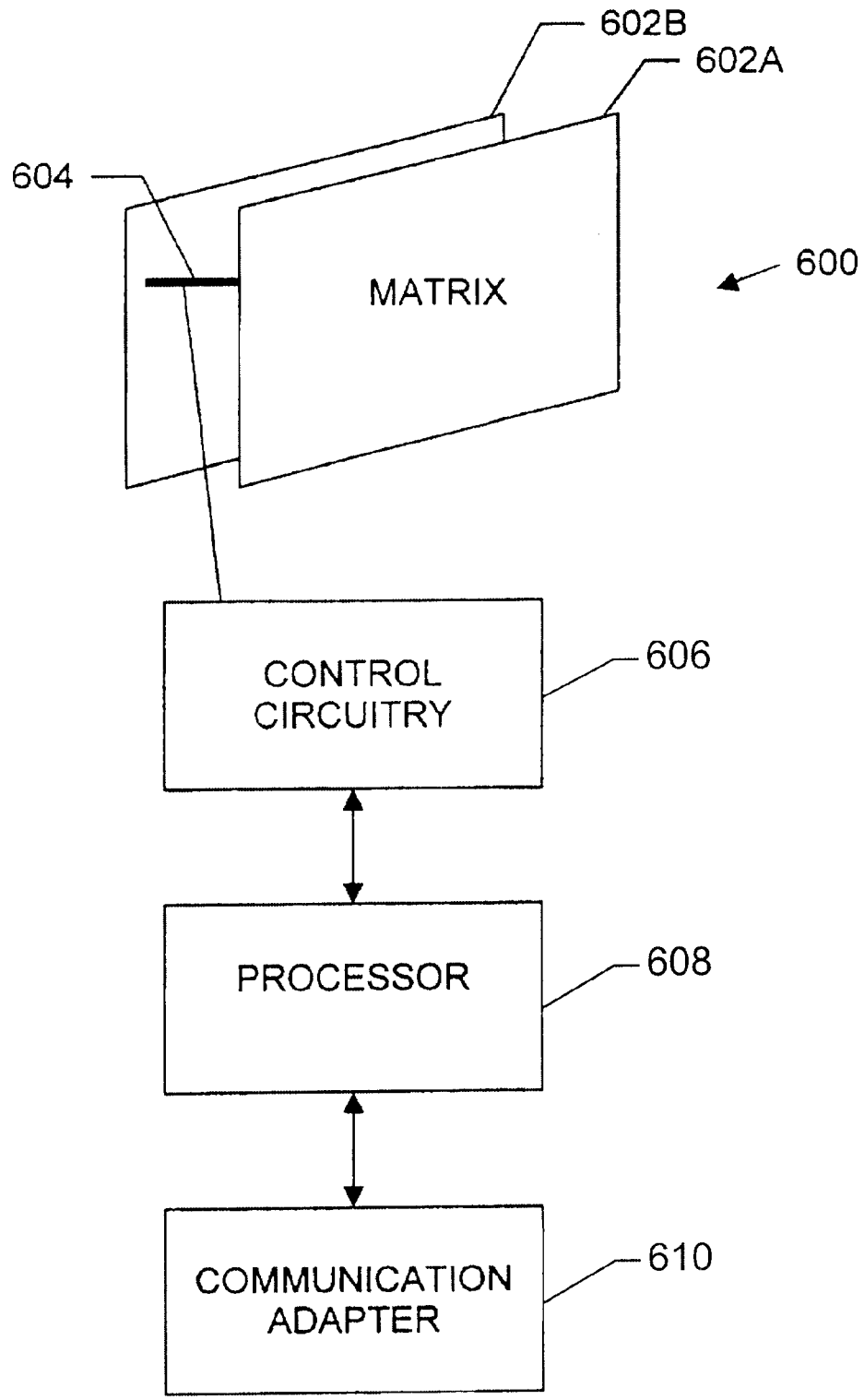
FIG. 6 is an exemplary block diagram of a cross connect switch shown in FIG. 2.
Figure 7:
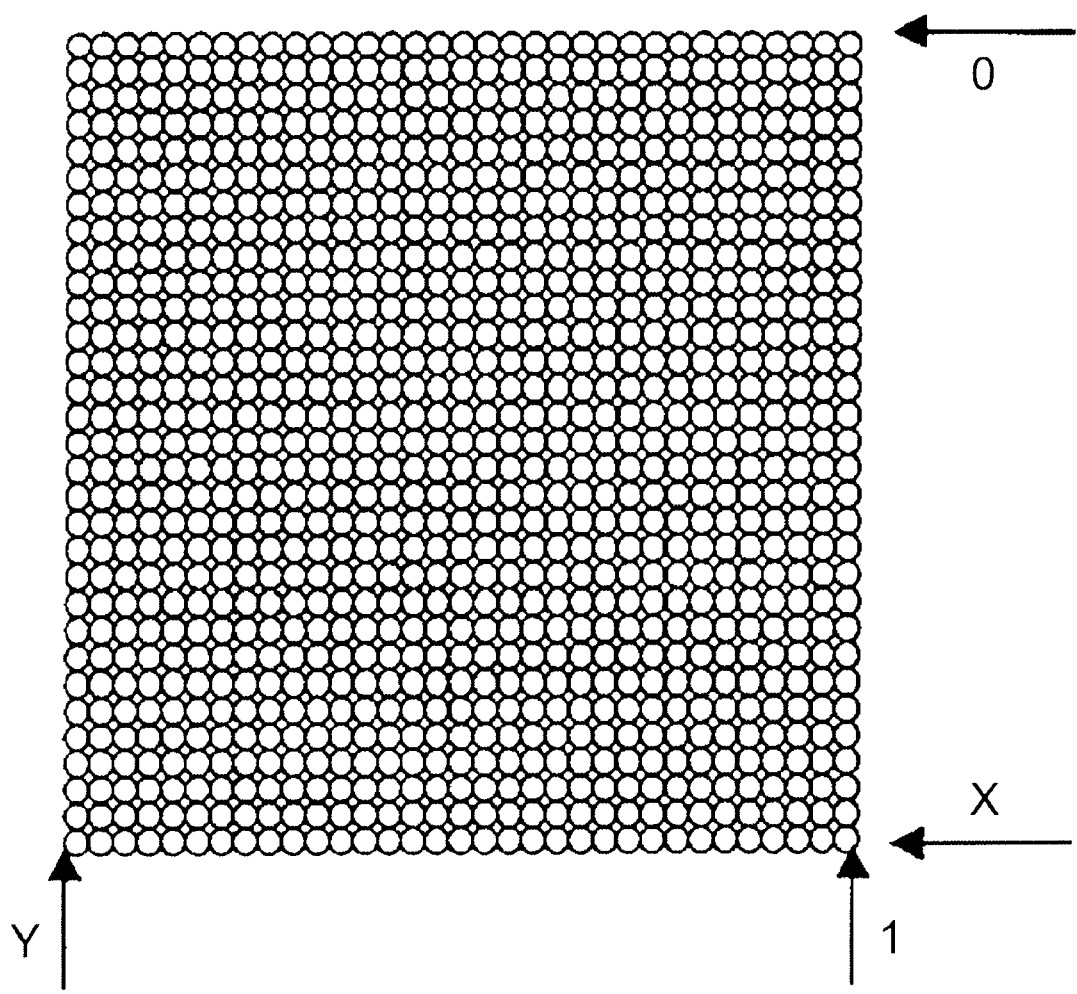
FIG. 7 shows an exemplary matrix board included in the cross connect switch shown in FIG. 6.
Figure 8:
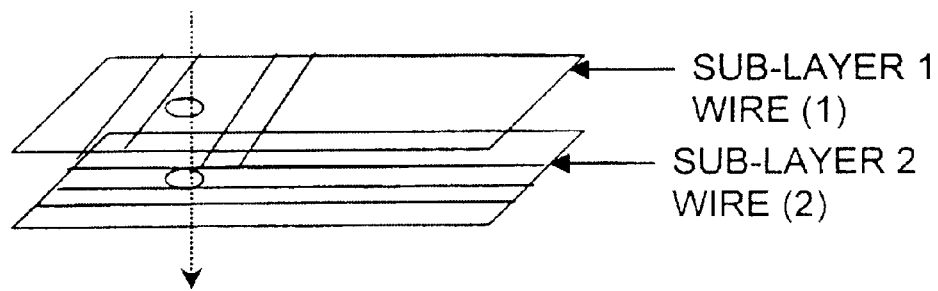
FIG. 8 shows an example of cross point connection in the matrix board shown in FIG. 7.
Figure 9:
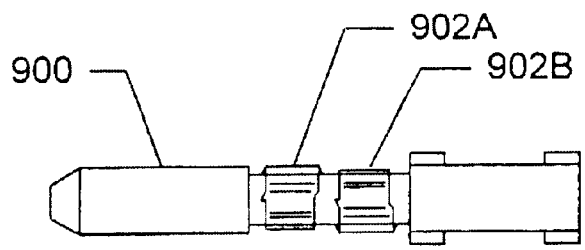
FIG. 9 shows an exemplary cross point connection pin used to establish a cross point connection in the matrix board shown in FIG. 7.

An exemplary block diagram of a cross connect switch 600 is shown in FIG. 6. Switch 600 includes matrix boards 602A and 602B, robotic cross connector 604, control circuitry 606, processor 608 and communication adapter 610. Matrix boards 602A and 602B, an example of which is shown in more detail in FIG. 7, are multi-layer matrices of circuits having holes at the intersections of circuits on different layer. The holes, known as cross points, allow the connection of pairs of circuits on different layers by the use of conductive pins. To make a cross connections, a pin is inserted into one of the holes in a matrix board, as shown in FIG. 8. Each pin, such as pin 900, shown in FIG. 9, has two metal contacts 902A and 902B on the shaft, which create the connection between the circuits on different layers of the matrix board.

Figure 10:
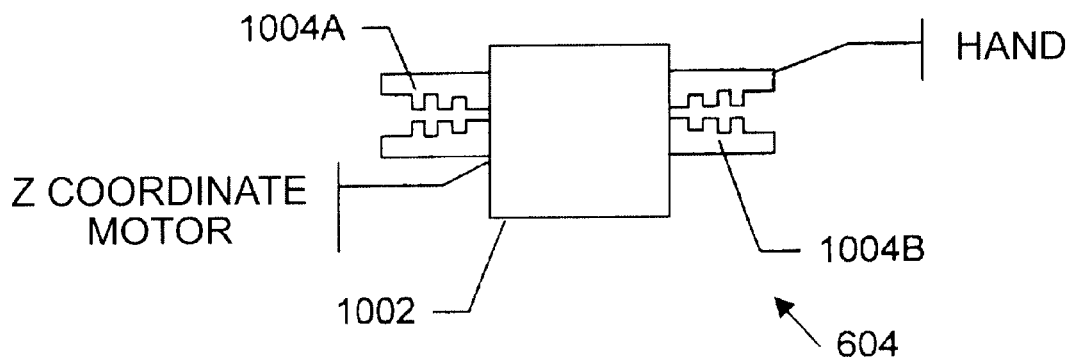
FIG. 10 shows an exemplary robotic cross connector included in the cross connect switch shown in FIG. 6.

Robotic cross connector 604, an example of which is shown in FIG. 10, provides the capability to move a pin to an appropriate cross point and to insert the pin to form a connection at the cross point or remove the pin to break a cross connection. The mechanism of robotic cross connector 604 is capable of movement in three dimensions, using a separate motor for movement in each dimension. For example, Z-coordinate motor 1002, shown in FIG. 10, provides movement of the mechanism along the Z axis. A pin is carried, inserted and removed by a robotic "hand", such as hand 1004A or 1004B, which is part of robotic cross connector 604.

Control circuitry 606 generates the signals necessary to control operation of robotic cross connector 604, in response to commands from processor 608. Processor 608 generates the commands that are output to control circuitry 606 in response to commands received from the network management system via communication adapter 610.

Figure 11:
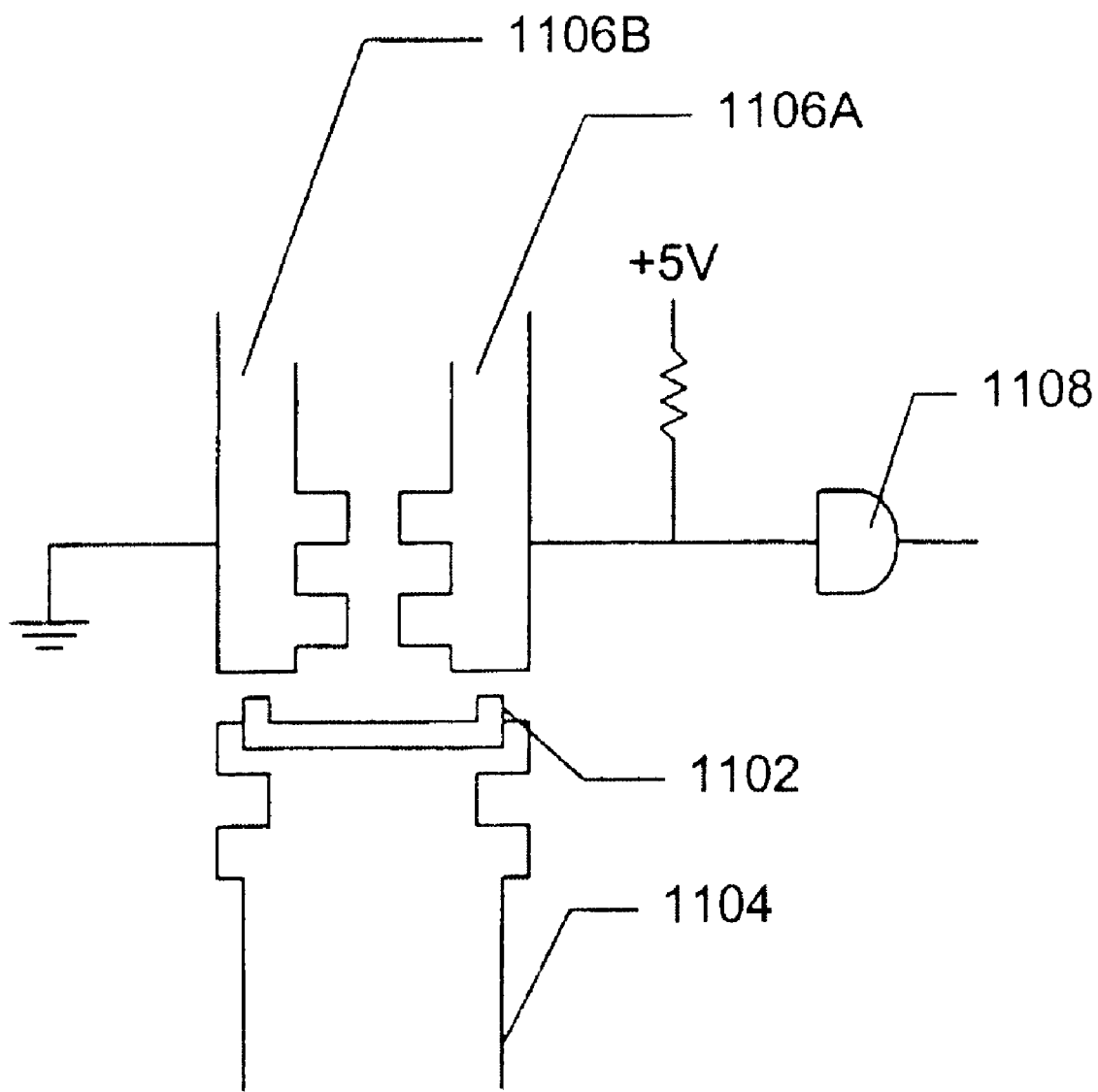
FIG. 11 is an exemplary block diagram of an apparatus that verifies proper connection of a cross point connection pin shown in FIG. 9.

Once the pin has been inserted into the cross-point, robotic cross connector 604 then verifies that the connection has been successfully made, as shown in FIG. 11. In addition to the metal contacts on the shaft of each pin that form the connections, there is also a metal strip 102 attached to each pin, such as pin 900. The robot verifies the connection by sending a small current from one hand 1106A to the other hand 1106B. The metallic parts of the robot hand are electrically insulated. Hand 1106B is connected to the ground and hand 1106A is connected to current detector 1108. When the hands touches the metallic strip on the head of connect pin, current flows through the pin and the output of detector 1108 will change states if the insertion is good. If the insertion is not good then the output of detector 1108 will not change.

Figure 12:
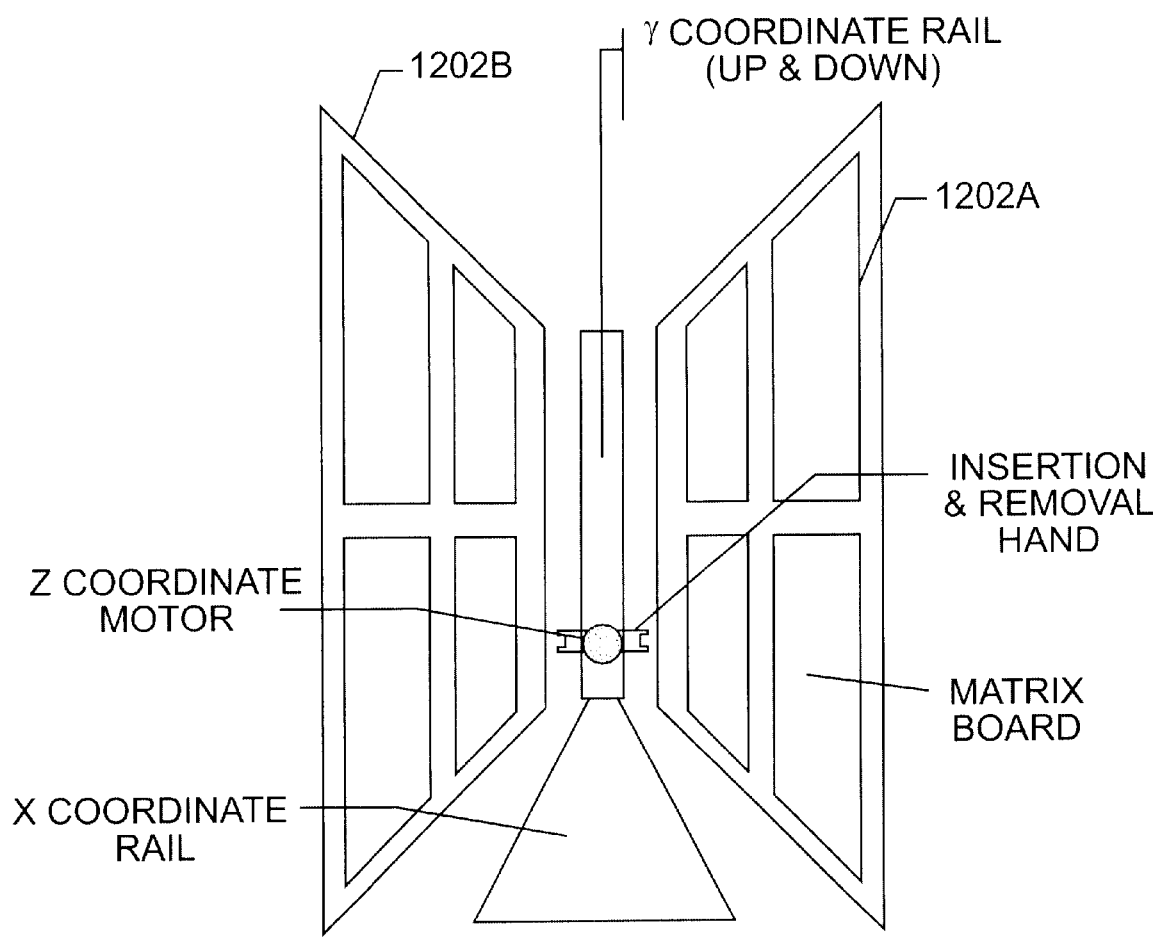
FIG. 12 shows an example of matrix boards in relation to the robotic cross connector.
Figure 13:
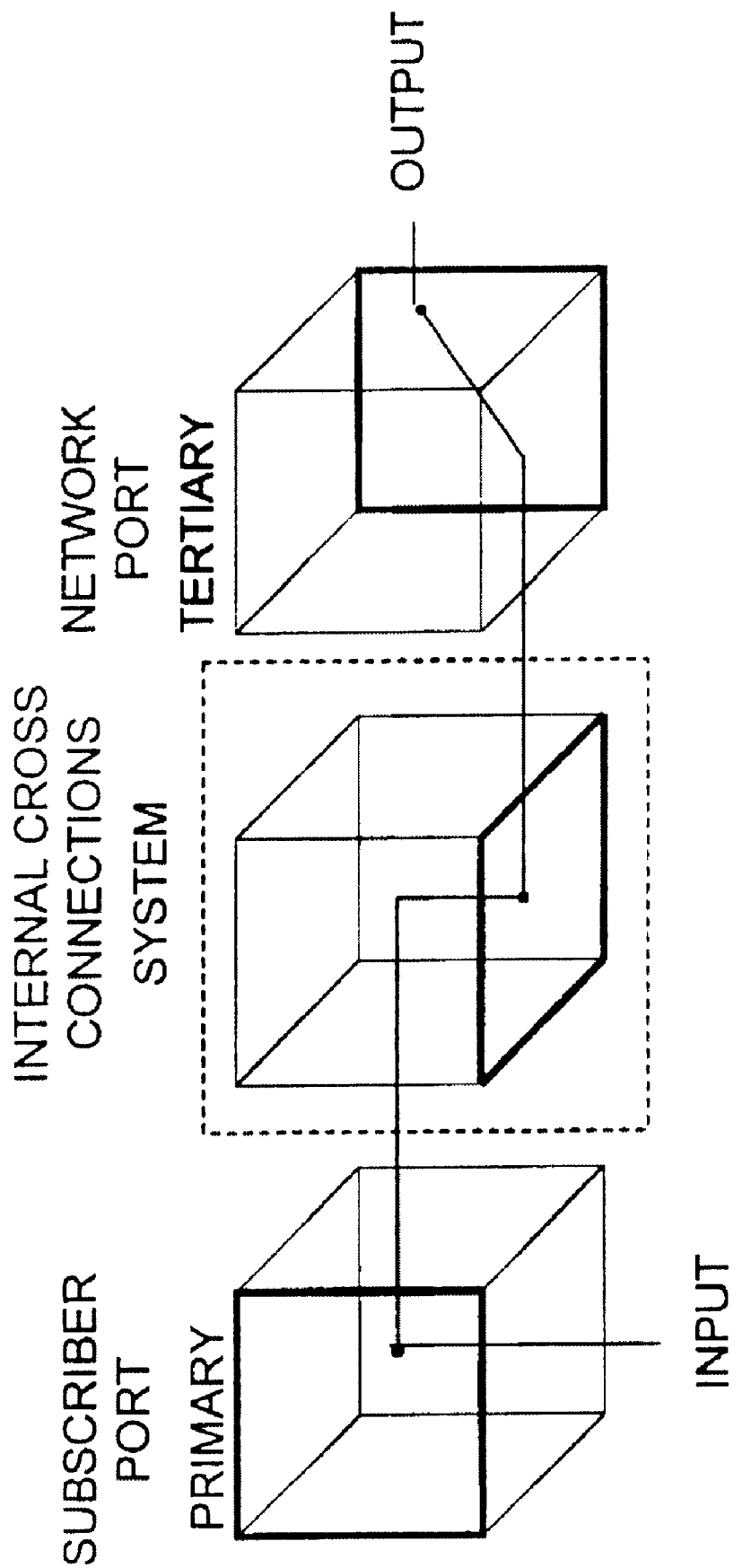
FIGS. 13–18 illustrate some standard 3 dimensional connection paths, which are completed by the cross connect switch in response to commands.
Figure 14:
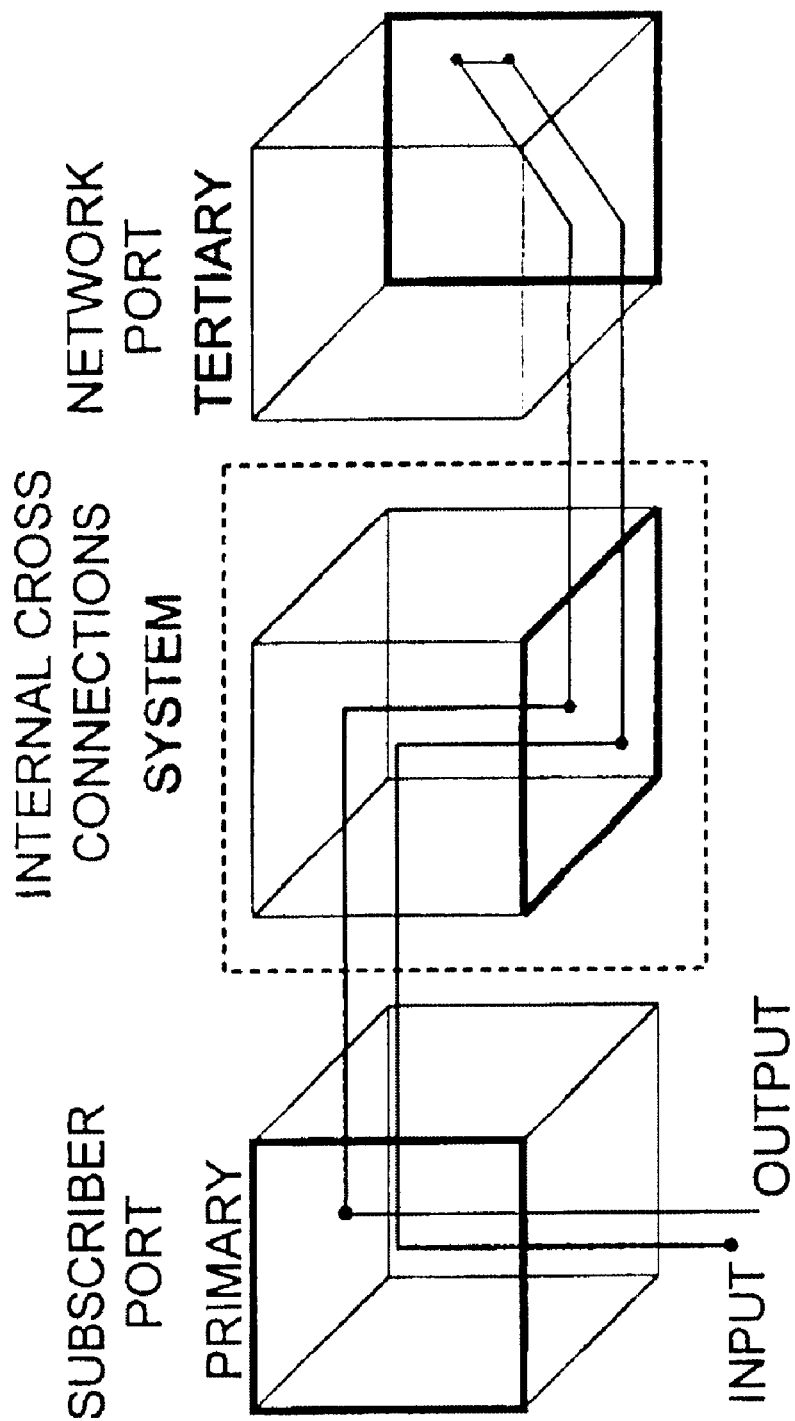
Figure 15:
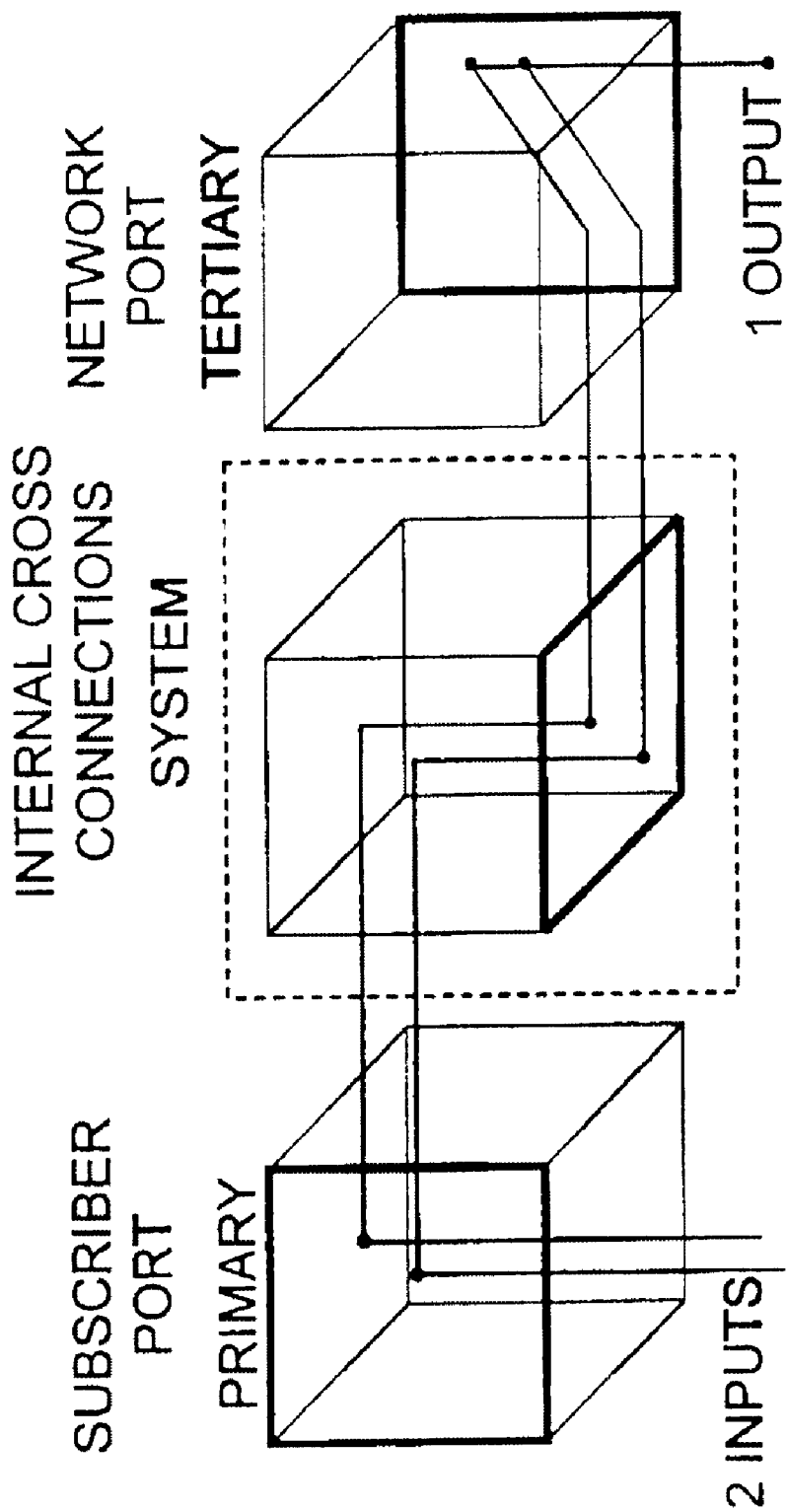
Figure 16:
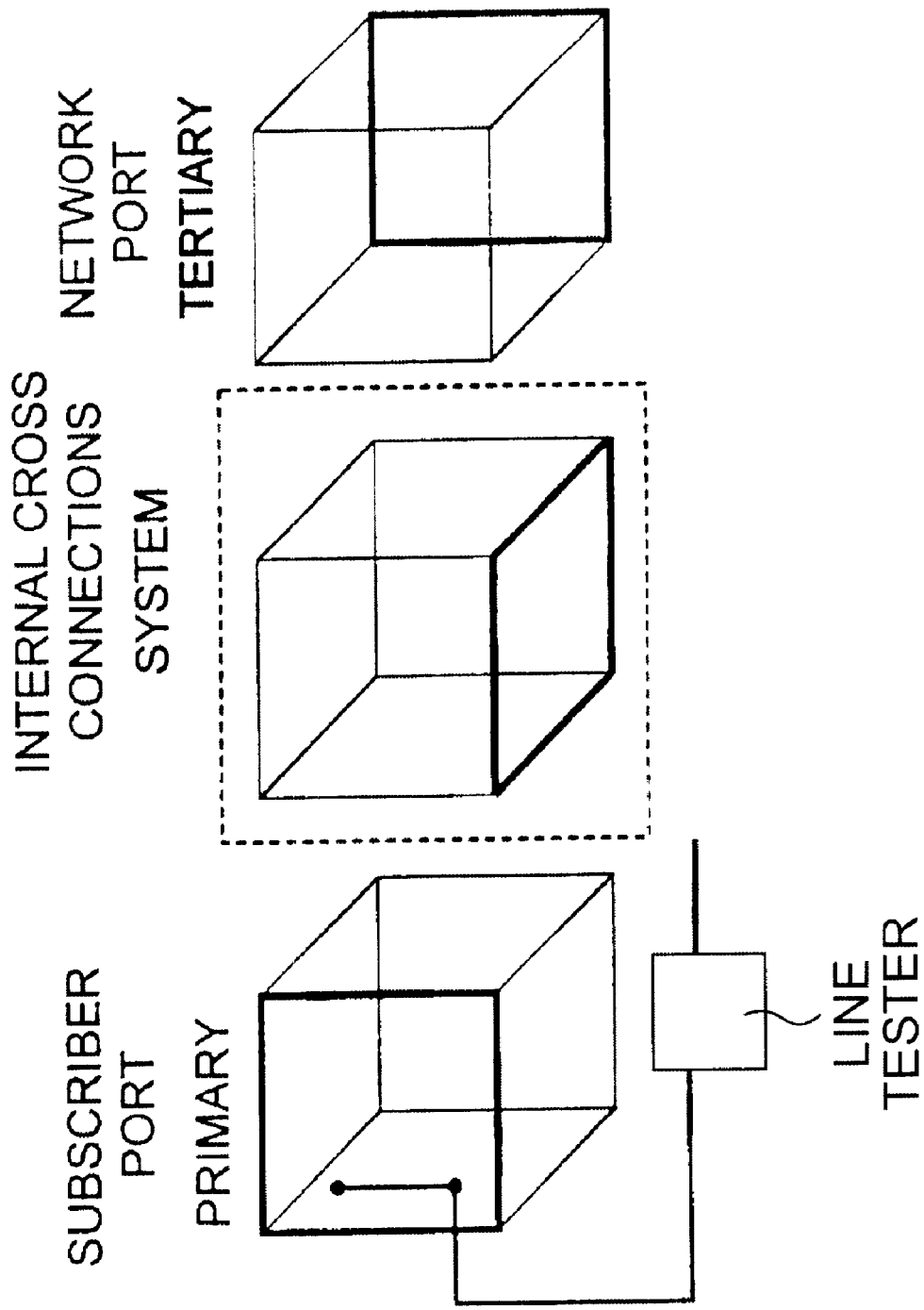
Figure 17:
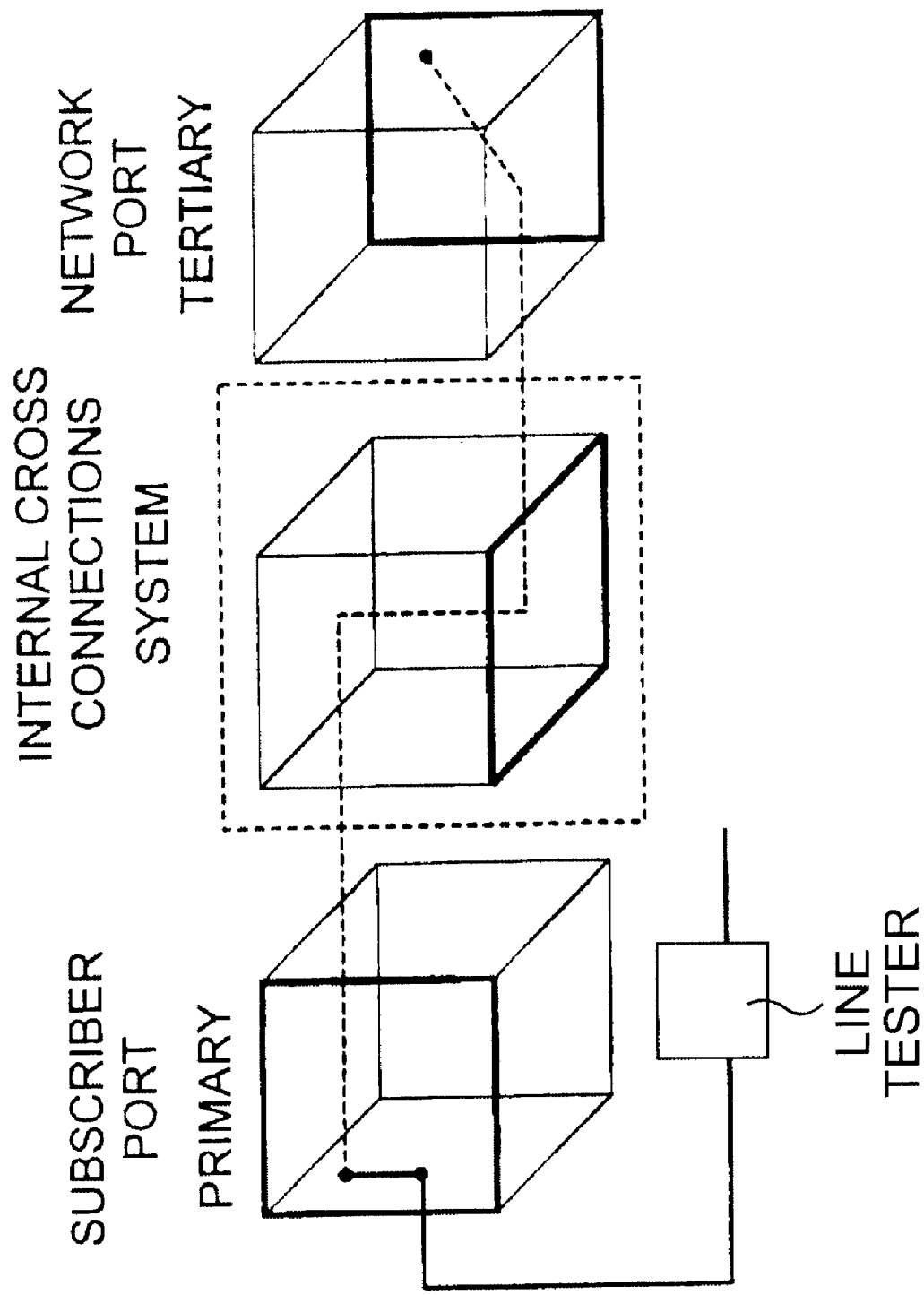
Figure 18:
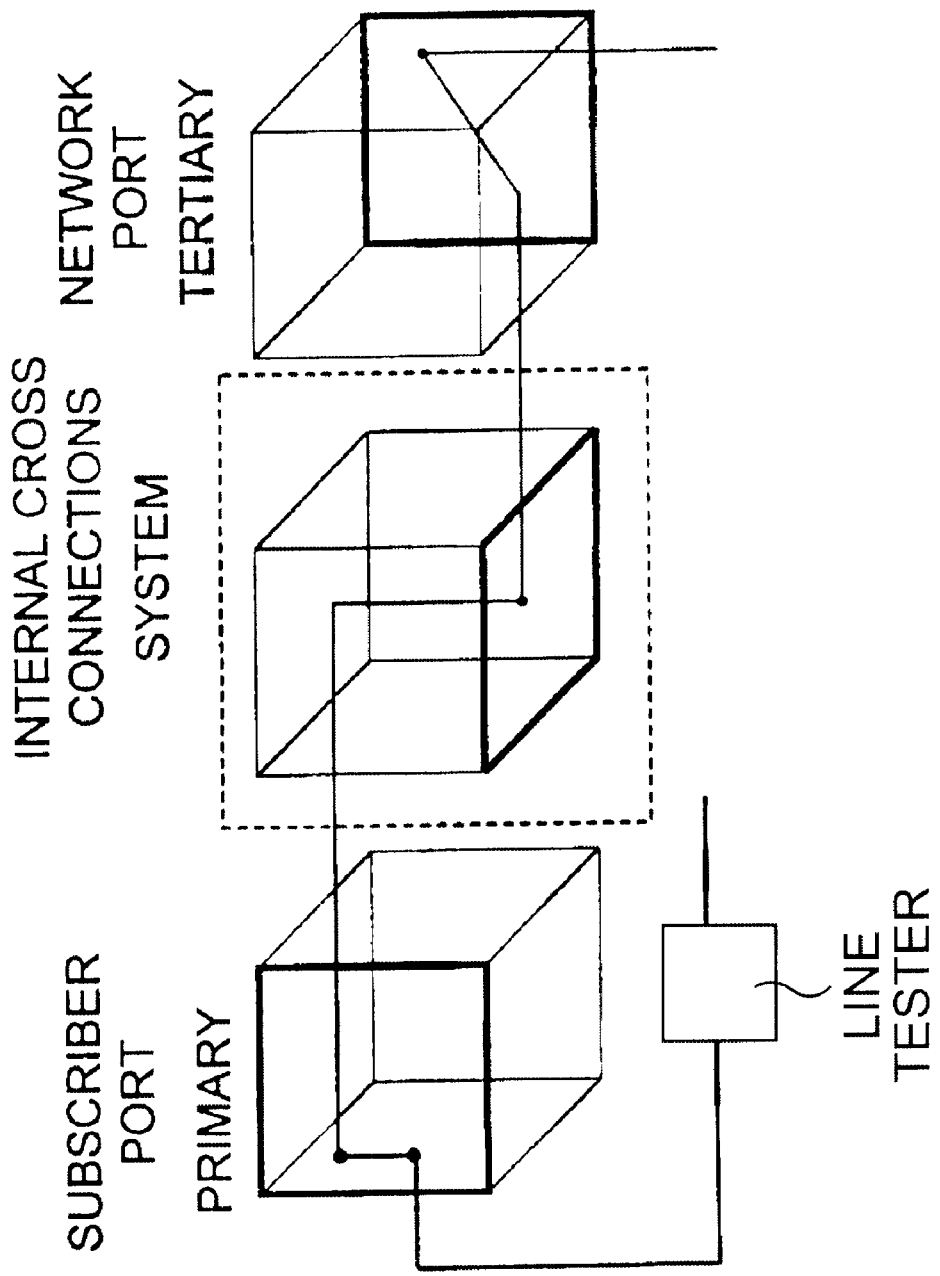

An example of matrix boards in relation to the robotic cross connector is shown in FIG. 12. As shown, typically two mother boards 1202A and 1202B, upon which matrix boards are mounted, one robotic cross connector 604, and the additional circuitry are grouped to form a cross connect system.

FIGS. 13–18 illustrate some standard 3 dimensional connection paths, which are completed by the cross connect switch in response to commands.

Although specific embodiments of the present invention have been described, it will be understood by those of skill in the art that there are other embodiments (for example relay based cross-connects, etc.) that are equivalent to the described embodiments. Accordingly, it is to be understood that the invention is not to be limited by the specific illustrated embodiments, but only by the scope of the appended claims.

What is claimed is:

1. A method for automatically provisioning shared data and voice service for a telecommunications line, comprising:
   providing separate voice and data paths;
   providing a splitter having separate voice and data ports coupled to the separate voice and data paths and a shared port that represents a combination of signals on the separate ports; and
   providing a cross connect switch that provisions service by controllably connecting the data path to the data port of the splitter and by controllably connecting the shared port of the splitter to a shared line in a first state and a test unit to the shared line in a second state.

2. The method according to claim 1, wherein the voice path occupies low frequencies of the shared line and the data path occupies high frequencies of the shared line.

3. The method according to claim 1, wherein an ILEC maintains the voice path and a CLEC maintains the data path.

4. The method according to claim 3, wherein the CLEC provides the cross connect switch.

5. The method according to claim 4, wherein the CLEC further provides the splitter.

6. The method according to claim 3, wherein the ILEC provides the cross connect switch and the splitter.

7. The method according to claim 1, further comprising:
   monitoring the shared line; and
   testing shared line when the line is on-hook.

8. The method according to claim 7, wherein a controller coupled to the cross connect switch controls the controllable paths.

9. The method according to claim 8, wherein the controller is coupled to the cross connect switch via a network.

10. The method according to claim 8, further comprising:
    connecting the shared line to a subscriber through a MDF.

11. A system for automatically provisioning shared data and voice service over a telecommunications line, comprising:
    a splitter having separate voice and data ports coupled to separate voice and data paths and a shared port that represents a combination of signals on the separate voice and data ports; and
    a cross connect switch that provisions service by controllably connecting the data path to the data port of the splitter and by controllably connecting the shared port of the splitter to a shared line in a first state and a test unit to the shared line in a second state.

12. The system according to claim 11, further comprising a controller coupled to the cross connect switch that controls the controllable paths.

13. The system according to claim 12, wherein the controller is coupled to the cross connect witch via a network.

14. The system according to claim 11, wherein the voice path occupies low frequencies of the shared line and the data path occupies high frequencies of the shared line.

15. The system according to claim 11, wherein an ILEC maintains the voice path and a CLEC maintains the data path.

16. The system according to claim 15, wherein the CLEC provides the cross connect switch.

17. The system according to claim 16, wherein the CLEC further provides the splitter.

18. The system according to claim 15, wherein the ILEC provides the cross connect switch and the splitter.

19. The method according to claim 1, wherein the test unit monitors the shared line on only when the shared line is on-hook.

* * * * *